(12) United States Patent
Virtanen

(10) Patent No.: US 7,394,786 B2
(45) Date of Patent: *Jul. 1, 2008

(54) METHOD AND SYSTEM FOR LIMITING QUALITY OF SERVICE OF DATA TRANSMISSION

(75) Inventor: Kari Virtanen, Tamper (FI)

(73) Assignee: Nokia Corporation, Espoo (FI)

( * ) Notice: Subject to any disclaimer, the term of this patent is extended or adjusted under 35 U.S.C. 154(b) by 646 days.

This patent is subject to a terminal disclaimer.

(21) Appl. No.: 10/967,228

(22) Filed: Oct. 19, 2004

(65) Prior Publication Data

US 2005/0047337 A1 Mar. 3, 2005

Related U.S. Application Data

(63) Continuation of application No. 09/877,247, filed on Jun. 11, 2001, now Pat. No. 6,879,834, which is a continuation of application No. PCT/FI99/01038, filed on Dec. 15, 1999.

(30) Foreign Application Priority Data

Dec. 16, 1998 (FI) ..................................... 982721

(51) Int. Cl.
*H04Q 7/00* (2006.01)
(52) U.S. Cl. .................. 370/329; 455/452.2; 455/452.1
(58) Field of Classification Search ................ 455/450, 455/451, 453, 452.1, 452.2; 370/329, 332, 370/395
See application file for complete search history.

(56) References Cited

U.S. PATENT DOCUMENTS 5,825,761 A 10/1998 Tanaka et al.

6,201,971 B1 3/2001 Purnadi et al.

FOREIGN PATENT DOCUMENTS

| EP | 848 560 A2 | 6/1998 |
| EP | 973 352 | 1/2000 |
| JP | 08-079160 | 3/1996 |
| JP | 9-46290 | 2/1997 |
| JP | 10-136423 | 5/1998 |
| JP | 11-31187 | 11/1999 |
| WO | WO 98/14020 | 4/1998 |
| WO | WO 99/05828 | 7/1998 |
| WO | WO 98/45966 | 10/1998 |
| WO | WO 00/10357 | 2/2000 |

*Primary Examiner*—Lewis G West
(74) *Attorney, Agent, or Firm*—Pillsbury Winthrop Shaw Pittman LLP

(57) ABSTRACT

A method of limiting the quality of service of data transmission in a wireless telecommunications system, in which the quality of service of data transmission is defined by means of quality of service parameters. Subscriber-specific maximum values are defined for the quality of service parameters and stored in a database comprising subscriber data. When the terminal requests connection establishment defined with quality of service parameters, the subscriber-specific maximum values are checked in the database and they are compared with the quality of service parameters requested by the terminal. Depending on whether the quality of service parameters requested by the terminal are within the limits defined by the maximum values of the parameters or whether at least one quality of service parameter requested by the terminal exceeds the maximum value defined for said parameter, either a connection is established or connection establishment is rejected.

14 Claims, 3 Drawing Sheets

METHOD AND SYSTEM FOR LIMITING QUALITY OF SERVICE OF DATA TRANSMISSION

CROSS-REFERENCE TO RELATED APPLICATIONS

This is a continuation of U.S. patent application Ser. No. 09/877,247, filed on Jun. 11, 2001, now U.S. Pat. No. 6,879,834 which is a continuation of PCT/FI99/01038, filed Dec. 15, 1999, which relies on the priority date for Finnish Application No. 982721, filed Dec. 16, 1998, the contents of all of which are incorporated herein by reference in their entireties.

BACKGROUND OF THE INVENTION

1. Field of the Invention

The invention relates to a method of limiting the quality of service of data transmission in a wireless telecommunications system which comprises at least one terminal and a fixed network which comprises a database for storing subscriber data, the method comprising defining the quality of service of data transmission by means of quality of service parameters.

The invention also relates to a wireless telecommunications system which comprises at least one terminal and a fixed network which comprises a database for storing subscriber data by means of quality of service parameters, the quality of service being defined by means of quality of service parameters in the system.

2. Description of Related Art

In addition to speech services, digital mobile communication systems offer different data services, such as data transmission services and e-mail and Internet connections. Various multi-media services which are used via the mobile communication network are being introduced gradually. Different data services set different requirements on the data transmission connection needed. Successful file transfer, for example, does not set any special requirements on the bit rate or delay of the transmission connection used, whereas real-time video transmission requires a high bit rate as well as minimal delay and number of errors to function properly. To allocate the limited resources of the mobile network optimally to mobile subscribers utilizing various services, special data transmission methods which allow control of the properties of a data transmission connection have been developed for mobile communication networks.

Both circuit-switched and packet-switched data transmission methods have been developed for the European digital GSM mobile communication network (Global System for Mobile Communication), for example. During the past few years the European Telecommunication Standards Institute ETSI has drawn up standards for the GSM 2+ phase which also define a new packet-switched data transmission service known as the GPRS (General Packet Radio Service). The GPRS is a packet network which utilizes the GSM network and in which transmission of data packets on the air interface between the mobile station and the GPRS network is optimized by means of GPRS protocol layers. The network operator and the mobile subscriber can agree on the data rate to be used within a range of 9.6 to 171.2 kbps. The GPRS standards also define quality of service parameters, i.e. QoS parameters, which, in addition to the above-mentioned data rate, include priority between the services, reliability of data transmission (i.e. error ratio) and allowed delay. By controlling these QoS parameters a suitable QoS profile can be selected for each data connection and service to be used. When the mobile user wants to use a certain data service, he may ask for a QoS profile suitable for this data service from the network operator in connection with call set-up. If the mobile communication network can carry out the request made, the network allocates a connection having the desired QoS profile to the mobile station. If the network is unable to allocate a connection which is good enough for the requested QoS profile e.g. because there are not enough resources available, the mobile station has to ask for a connection with a lower QoS profile or wait until a sufficient amount of the network resources becomes available for carrying out the original request. In that case the network operator may charge the mobile subscriber on the basis of the QoS profile used, and naturally, the use of a transmission connection with a better quality costs more than the use of a connection with QoS parameters of a poorer quality.

A problem arises in the arrangement described above when the mobile user and the owner of the mobile subscription (i.e. the one who pays the bill) are different persons. For example, an employee may have a company mobile phone, or parents may pay their children's mobile phone bills. When various data services become differentiated, efficient use of the available services will require transmission connections of very different qualities. The unit prices of these connections also vary considerably. In that case it might be in the interests of the owner of the mobile subscription to limit the costs of the transmission connections to be used to a certain unit price. This is not, however, possible in the existing GPRS system where the mobile user makes a request for the desired quality of the transmission connection to the network and the owner of the mobile subscription cannot influence this in any way. We also face similar problems in other mobile network-based network solutions where the quality parameters of a transmission connection can be changed as desired. These networks include the GSM-based high-speed circuit-switched data service HSCSD and intelligent network solutions IN designed for mobile communication networks.

BRIEF SUMMARY OF THE INVENTION

The object of the present invention is to provide a method and an apparatus implementing the method to eliminate the above-mentioned problems. The objects of the invention are achieved with a method which is characterized by defining a subscriber-specific maximum value for at least one quality of service parameter, storing the subscriber-specific maximum value of said at least one quality of service parameter in the database comprising the subscriber data, and limiting the quality of service of the connection to be established between the terminal and the fixed network so that on said connection no quality of service parameter exceeds the subscriber-specific maximum value of said quality of service parameter.

The system of the invention is characterized in that a subscriber-specific maximum value is defined for at least one quality of service parameter, the subscriber-specific maximum value of at least said one quality of service parameter is stored in the database comprising the subscriber data, and the quality of service of the connection to be established between the terminal and the fixed network is arranged to be limited so that on said connection no quality of service parameter exceeds the subscriber-specific maximum value of said quality of service parameter.

According to a preferred embodiment of the invention, subscriber-specific maximum values are checked in a database including subscriber data in response to the fact that the terminal requests connection establishment defined with quality of service parameters, whereafter the quality of service parameters requested by the terminal are compared with the subscriber-specific maximum values of the quality of service parameters and either of the following procedures is performed: a connection is established in response to the fact that the quality of service parameters requested by the terminal are within the limits defined by the maximum values of said quality of service parameters, or establishment of a connection is rejected in response to the fact that at least one of the quality of service parameters requested by the terminal exceeds the maximum value defined for said quality of service parameter.

Furthermore, according to a preferred embodiment of the invention, establishment of a connection with lower values of the quality of service parameter is offered to the terminal in response to the fact that at least one of the quality of service parameters requested by the terminal exceeds the maximum value defined for said quality of service parameter or the resources of the system.

The invention is based on the idea that allowable maximum values of quality of service parameters are set for the terminal, preferably for the mobile station, which can request a transmission connection according to these parameters from the fixed network. On the side of the fixed network these maximum values of quality of service parameters are checked as the terminal asks for establishment of a connection and, if the requested quality of service parameters exceed the maximum values, the fixed network refuses to establish a connection. The network may also offer connection establishment to the terminal with values lower than the requested quality of service parameters.

An advantage of the method and system of the invention is that the owner of the mobile subscription can define the maximum values of the quality of service parameters and thus limit the costs of the transmission connections to be used to a certain unit price. This is particularly useful when the owner of the mobile subscription and the mobile user are different persons.

BRIEF DESCRIPTION OF THE SEVERAL VIEWS OF THE DRAWINGS

The invention will be described in greater detail by means of preferred embodiments with reference to the accompanying drawings, in which.

DETAILED DESCRIPTION OF THE INVENTION

In the following, the invention will be described more closely on the basis of the GPRS system with reference to FIG. 1. It should be noted that implementation of the invention in the GPRS system is only an example of the preferred embodiments of the invention, and thus the invention can be implemented in any other corresponding system.

Figure 1:
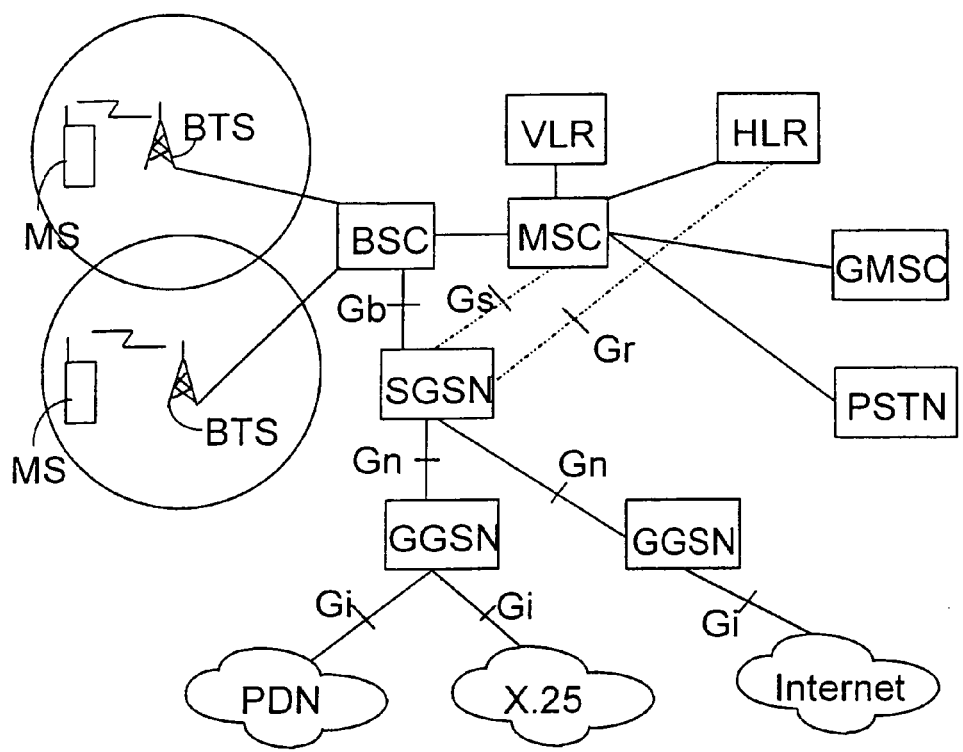
FIG. 1 illustrates a wireless packet-switched telecommunications system according to a preferred embodiment of the invention.

FIG. 1 illustrates how the GPRS system is built on the basis of the GSM system. The GSM system comprises mobile stations (MS) which communicate with base transceiver stations BTS via radio paths. There are several base stations BTS connected to a base station controller BSC which controls the radio frequencies and channels available to the base stations. The base station controllers BSC communicate with a mobile services switching centre MSC, which is responsible for establishing connections and routing calls to correct destinations. To perform these functions, the mobile services switching centre utilizes two databases which comprise information on mobile subscribers: a home location register HLR which contains information on all subscribers of the mobile network and the services they subscribe to, and a visitor location register VLR which contains information on the mobile stations visiting the area of a certain mobile services switching centre MSC. The mobile services switching centre MSC communicates with other mobile services switching centres via a gateway mobile services switching centre GMSC and with the public switched telephone network PSTN. With respect to a more detailed description of the GSM system reference is made to ETSI/GSM specifications and *The GSM System for Mobile Communications*, M. Mouly and M. Pautet, Palaiseau, France, 1992, ISBN:2-957190-07-7.

The GPRS system connected to the GSM network comprises two almost independent functions, i.e. a gateway GPRS support node GGSN and a serving GPRS support node SGSN. The GPRS network may comprise several gateway nodes and serving nodes, and typically several gateway nodes GGSN are connected to one serving node SGSN. Both nodes SGSN and GGSN function as routers which support the mobility of the mobile station, control the mobile communication system and route data packets to mobile stations regardless of their location and the protocol used. The serving node SGSN communicates with the mobile station MS via the mobile communication network. The connection to the mobile communication network (interface Gb) is typically established either via the base station BTS or the base station controller BSC. It is the duty of the serving node SGSN to detect the mobile stations in its service area which are capable of GPRS connections, send data packets to and receive data packets from these mobile stations and monitor the location of the mobile stations in its service area. In addition, the serving node SGSN communicates with the mobile services switching centre MSC and the visitor location register VLR via signalling interface Gs and with the home location register HLR via interface Gr. There are also GPRS records which contain the contents of subscriber-specific packet data protocols stored in the home location register HLR.

The gateway node GGSN functions as a gateway between the GPRS network and an external data network (PDN, Packet Data Network). The external data network may be e.g. the GPRS network of another network operator, Internet, X.25 network or a private local area network. The gateway node GGSN communicates with these data networks via interface Gi. The data packets to be transferred between the gateway node GGSN and the serving node SGSN are always encapsulated according to the GPRS standard. The gateway node SGSN also contains the PDP addresses (Packet Data Protocol) and routing data, i.e. SGSN addresses of the GPRS mobile stations. The routing data are used for linking data packets between the external network and the serving node SGSN. The GPRS backbone network between the gateway node GGSN and the serving node SGSN is a network utilizing an IP protocol, preferably IPv6 (Internet Protocol, version 6).

When the mobile user wants to use a certain data service, the mobile station sends a GPRS attach message to the GPRS network and simultaneously tries to activate the PDP context of the data service in question, i.e. tries to establish a logical link with the gateway node GGSN providing the data service in question. For the mobile station MS to be able to attach to the GPRS network, the mobile station has to be recognized and the subscriber rights checked, which is carried out in the serving node SGSN. The serving node SGSN checks the identification data of the mobile station in the subscriber profile included in the home location register HLR and whether the mobile station is entitled to the subscribed data service or protocol. For example, IP may be defined as an allowed protocol in the subscriber profile, but not X.25, or only certain Internet addresses may be allowed. The subscriber profile may also comprise definitions of certain services, such as filtering of certain data from the subscribed data service. The mobile subscriber may have several subscriber profiles in which the allowed source and destination addresses of data transmission and the types and protocols of messages to be transmitted can be defined. The subscriber can set barring to one or more subscriber profiles when he, for example, lends the mobile station to another person. In that case the subscriber sends a request for barring, which may also be protected with a password, to the mobile communication network. The serving node SGSN checks the possible password in the home location register HLR, requests the home location register to update the barring status and sends an acknowledgement to the mobile station MS. The service description and subscriber profiles of the GPRS are explained more closely in GSM specification 02.60 of ETSI. Call and connection barring and the related parameters are described in greater detail in GSM specification 02.88.

According to a preferred embodiment of the invention, a new parameter, QoS profile, is added to the above-mentioned parameters of connection barring. The QoS profile is used for setting the allowed maximum values for the parameters describing the quality of connection. In the case of the GPRS connections these parameters may be e.g. the bit rate, delay and error ratio which are defined in the subscriber profile. By means of the mobile station MS the mobile subscriber sets the desired maximum values for the parameters in each subscriber profile, which are preferably protected with a password. Naturally, the subscriber profiles can be defined when the mobile subscription is set up, but they can be preferably updated later in the manner described above. The subscriber profiles and the QoS parameters are stored in the home location register HLR.

Figure 2:
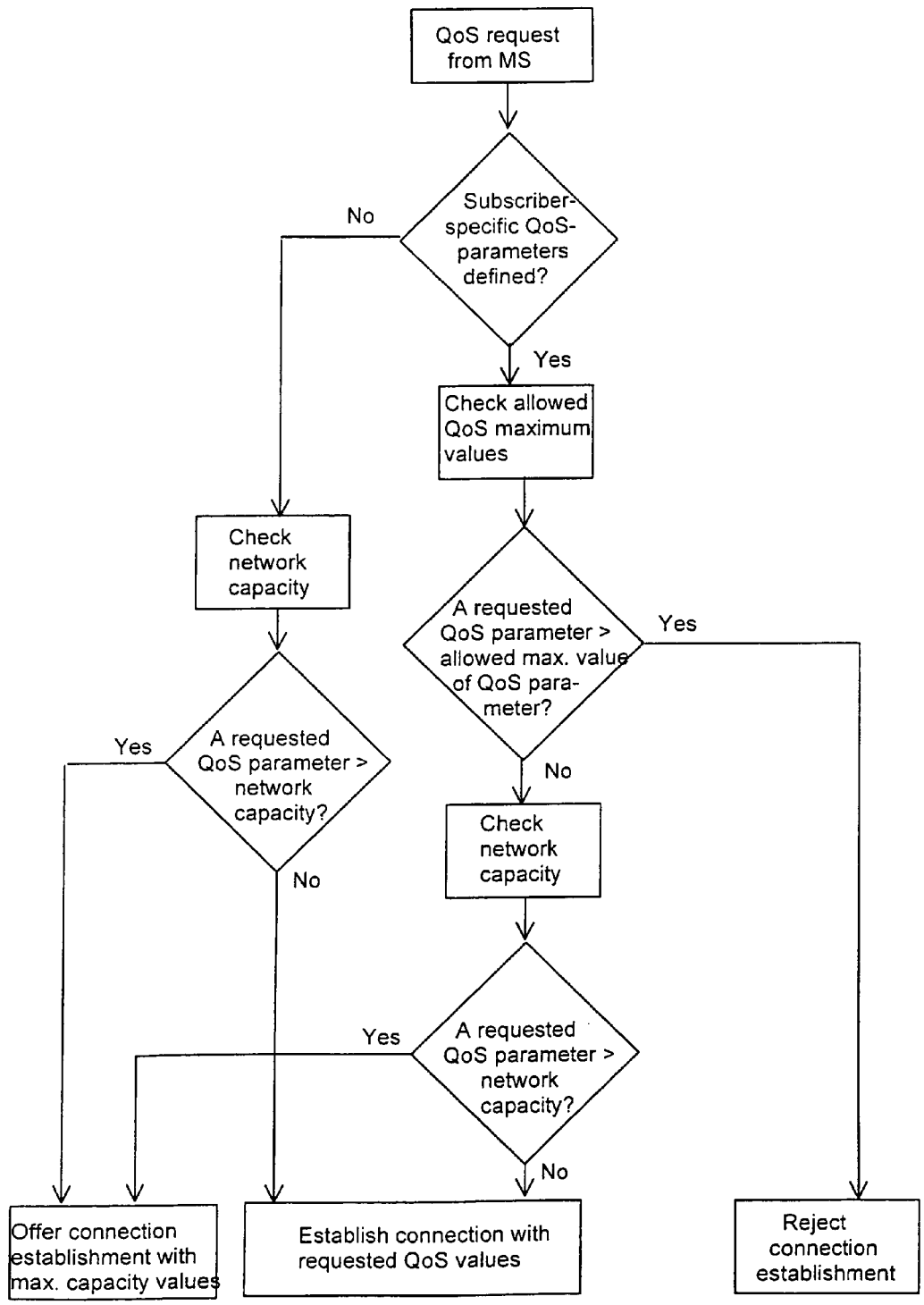
FIG. 2 is a block diagram illustrating connection establishment according to a preferred embodiment of the invention in respect of the network.

In the following the invention will be explained on the basis of FIG. 2. When the mobile user tries to use a GPRS data service, i.e. activate the data service routing context, he may simultaneously try to define certain quality parameter values for the connection himself, i.e. make a QoS service request to the network. The serving node SGSN checks the identification and authentication data of the subscriber profile used in the home location register HLR and any maximum values defined for the QoS parameters. If a QoS profile has been set for this subscriber profile, the serving node SGSN compares the QoS request made by the mobile station MS with the maximum values of parameters given in the QoS profile. If the value of no parameter in the QoS request made exceeds the maximum values defined in the QoS profile, a connection with the desired QoS parameters can be allocated to the mobile station MS, provided that the identification and authentication data are in order and the resources available in the GPRS system enable the desired quality of connection. If one or more of the requested QoS parameters exceed the allowed maximum value, the serving node SGSN does not allocate any connection to the mobile station MS, but the mobile station MS has to ask for a connection anew with lower values of the QoS parameters. If no QoS profile is defined for the subscriber profile, the maximum values of the QoS parameters used on the connection are determined by the available resources of the GPRS system.

According to a preferred embodiment of the invention, if the mobile station MS requests higher values of the QoS parameters for the connection than can be provided according to the set QoS profile or the available resources of the system, the serving node SGSN sends an acknowledgement message to the mobile station MS, thus offering the mobile station MS a chance of accepting connection establishment with the highest possible values of the QoS parameters. These highest possible values of the QoS parameters are defined either in the QoS profile or, if there is no QoS profile, according to the available resources of the system. In that case the mobile user may choose to establish a connection with the offered values of the QoS parameters or choose not to establish a connection at all. When the user wants to establish a connection to a service which requires a high-quality connection, such as real-time video transmission, it is often wiser not to establish a connection at all than to try to transmit the service using a poor-quality connection.

Figure 3:
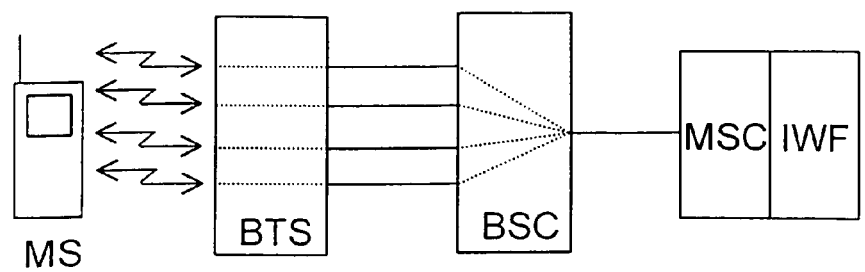
FIG. 3 illustrates a wireless circuit-switched telecommunications system according to a preferred embodiment of the invention.

The implementation of the invention is not limited only to the GPRS system described above. Preferably the invention can also be applied to a GSM-based high-speed circuit-switched data service HSCSD. In the HSCSD system the goal is to extend the air interface which has formed a bottleneck to data transmission in the GSM system so that a radio channel comprising several time slots instead of the traditional one time slot in the GSM system can be allocated to one mobile station. As is illustrated in FIG. 3, the time slots allocated to one mobile station MS are transmitted separately to the base station controller BSC via a base station BTS, and in the base station controller the time slots are combined into one channel before the data are transmitted to the mobile services switching centre MSC, which forwards the data by means of an interworking function IWF. Mobile stations supporting the HSCSD are divided into two classes (1 and 2) depending on whether they are capable of simultaneous transmission of data to the base station (uplink) and reception of data from the base station (downlink). According to the current GSM recommendations, three time slots out of eight are reserved for transition from transmission to reception and vice versa. Mobile stations belonging to class 1 are not capable of simultaneous uplink and downlink data transmission, and consequently at most five time slots can be allocated to them (uplink+downlink), and usually more time slots are allocated asymmetrically to the downlink than to the uplink. Mobile stations of class 2 are capable of simultaneous transmission and reception, and thus even 16 time slots (8 uplink+8 downlink) can be allocated to them at the same time. In that case the maximum data rate in one direction may be 76.8 kbps out of which the maximum amount of payload is 64 kbps. In the HSCSD there are also 18 multislot classes which are used for defining the desired number of time slots for the connection and for dividing the time slots into uplink and downlink time slots. Multislot classes 1 to 12 are reserved for mobile stations of class 1, and multislot classes 13 to 18 for mobile stations of class 2. In the HSCSD system billing is based on the time slots used on the connection, i.e. it is directly comparable to the desired bit rate. The HSCSD system is described in greater detail is GSM specifications 02.34 and 03.34.

The invention can be implemented in the HSCSD system by providing the subscriber data in the home location register HLR with a field which defines a subscriber-specific maximum value for a multislot class, i.e. the fact how many time slots the mobile user may request and how they can be divided between the uplink and the downlink directions. In the HSCSD system the mobile services switching centre MSC functions as an element which checks the subscriber's identification and authentication data and any maximum values defined for a multislot class in the home location register HLR or in the visitor location register VLR. In other respects the connection establishment and barring of connection establishment of the invention can be implemented in the same way as in the GPRS system. If the subscriber has not set any limit to the multislot class to be used, the maximum number of time slots to be allocated to the connection is not determined only on the basis of the available resources in the HSCSD, but also on the basis of the mobile station class. For example, more than five time slots cannot be allocated to a mobile station of class 1 in any case.

A preferred embodiment of the invention can also be implemented in intelligent network solutions designed for mobile communication networks. For example, ETSI has standardized an intelligent network-based solution called CAMEL (Customized Applications for Mobile Network Enhanced Logic) which is suitable for the GSM environment. The intelligent network solutions enable implementation of operator-specific value-added services, such as intelligent call diversion and call barring, subscriber-specific service numbers, calls to a predetermined number at lower rates, etc. Intelligent network solutions allow to implement the above-mentioned value-added services without the implementation of the services having to comply with a certain standard. This is achieved by separating the logical section of the system implementing call connection from the logical section implementing the value-added service. By means of CAMEL the value-added services offered by the home operator can also be used when the mobile subscriber is in the area of a visiting mobile network where the mobile communication network has a roaming agreement with the mobile subscriber's home operator.

Figure 4:
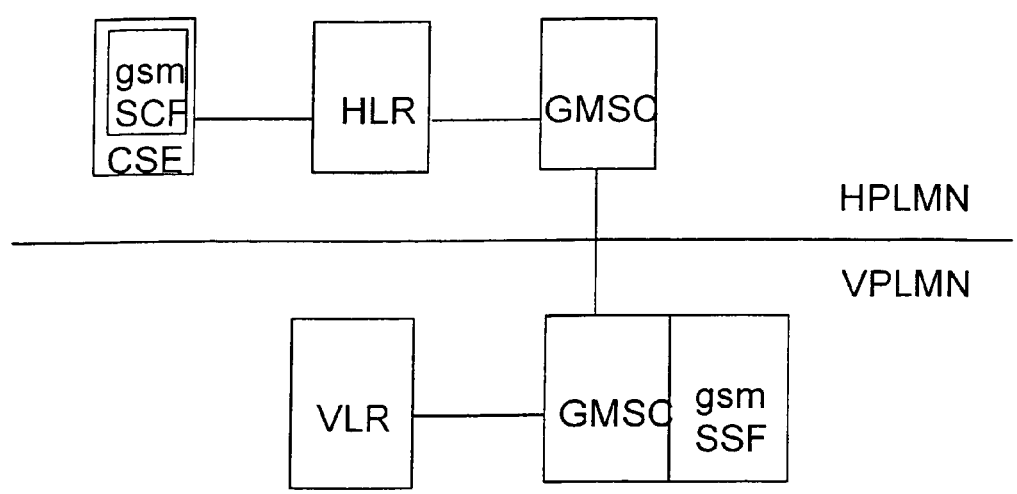
FIG. 4 illustrates an intelligent network-based wireless telecommunications system according to a preferred embodiment of the invention.

The implementation of CAMEL will be described in the following with reference to FIG. 4. In intelligent networks the system element implementing the value-added service is called a service control point SCP. In the CAMEL concept this task is performed by the CAMEL service environment CSE. The service environment CSE controls all outgoing and incoming calls of the CAMEL subscriber, regardless of the subscriber's location. If the CAMEL subscriber is in the area of a visiting mobile network (VPLMN, Visiting Public Landline Mobile Network), the home network (HPLMN, Home Public Landline Mobile Network) supplies all necessary information on the subscriber to the visiting mobile network. The CAMEL subscriber information CSI which defines the value-added services of each subscriber is stored in the home location register HLR. The CSI also comprises reference data separately for outgoing (O-CSI) and incoming (T-CSI) calls which define in which service control point SCP instructions are to be found. The most important support function of the service environment CSE is the GSM service control function (gsmSCF) which updates CSI files in the home location register HLR and maintains location data on CAMEL subscribers. The home network and the visiting mobile network communicate with each other via a gateway mobile services switching centre GMSC. When a CAMEL subscriber roams to the area of the visiting network, the CSI information are also updated in the visitor location register VLR of the visiting network. The mobile services switching centre of the visiting network comprises a GSM service switching function (gsmSSF) which checks the service definitions of the visiting CAMEL subscriber for outgoing calls, in particular.

The CAMEL concept is described more closely in GSM recommendations 02.78 and 03.78.

The invention can be implemented in connection with the CAMEL concept by providing the subscriber's service information with a field which defines subscriber-specific maximum values for different QoS parameters. In intelligent network systems the service control point SCP functions as an element which checks the allowed QoS parameters before a connection is established. As was stated above, in the CAMEL system the service environment CSE corresponds to this element, i.e. it checks the subscriber's service definition data in the home location register HLR, visitor location register VLR or directly in the SCP element of the network in question. Since the intelligent network solutions can also be implemented in connection with the data services provided by mobile networks, the QoS parameters to be defined for the service information may preferably include all parameters that are needed for determining the quality of either a packet-switched connection or a circuit-switched connection. The fact that the QoS profile of the data services is checked by means of the intelligent network solution also has the advantage that each operator may implement the checking in the desired manner. In a GPRS system, a connection by means of which the checking is easiest to perform can be preferably established from the serving node SGSN to the SCP element of the intelligent network.

The invention is usually implemented in an intelligent network by establishing a connection to the SCP element of the intelligent network to which the requested QoS parameters are supplied during PDP context activation or during establishment or adaptation of a mobile originated MO or mobile terminated MT connection. The SCP element checks the subscriber-specific maximum values defined for the QoS parameters and compares these with the requested QoS parameters. On the basis of this comparison the service control point SCP decides whether to continue or terminate connection establishment, or alternatively offers connection establishment with values lower than the requested QoS parameters. It should be noted that the subscriber-specific QoS limitations may also depend on other parameters, such as the time, date or location of the mobile station.

In a preferred embodiment of the invention the service provider may set limitations on the subscriber-specific quality of service parameters in some situations. An example of this is supply of expensive services to new customers when the service provider may first want to ensure that the customer is reliable and offer services with lower QoS parameters. Thus the customer's costs also remain low. After the relationship between the customer and the service provider has become established, the QoS parameters of the service offered can be upgraded. The implementation of this embodiment according to the invention corresponds to the implementation of the limitations set by the subscriber. The service provider sends information for limiting the QoS parameters of a connection related to a certain service of a certain subscriber to the network database which comprises the subscriber-specific service data. This embodiment is easy to implement particularly in connection with intelligent network solutions.

It is obvious to a person skilled in the art that, as the technology develops, the inventive concept can be implemented in various ways. For example, the invention is applicable to third-generation mobile communication systems under development, such as UMTS (Universal Mobile Telecommuni-cation System) and IMT-2000 (International Mobile Telecommunications). The invention and its embodiments are not limited to the examples described above, but may vary within the scope of the claims.

The invention claimed is:

1. A method for limiting the quality of service (QoS) of data transmission in a wireless telecommunications system which comprises at least one terminal and a fixed network which comprises a database for storing subscriber data, the method comprising:

defining the quality of service of-data transmission by means of quality of service parameters;

defining a subscriber-specific maximum value for at least one quality of service parameter;

storing the subscriber-specific maximum value of said at least one quality of service parameter in the database comprising the subscriber data;

checking, in response to the request made by the terminal for connection establishment defined with at least one quality of service parameter, the subscriber-specific maximum value of said quality of service parameter such that the at least one quality of service parameter requested by the terminal is compared with the subscriber-specific maximum value of the quality of service parameter; and offering connection establishment with lower values of the quality of service parameters to the terminal to be accepted if at least one of the quality of service parameters requested by the terminal exceeds the maximum value defined for said quality of service parameter or the resources of the system, or alternatively establishing a connection if each quality of service parameter requested by the terminal is within the limits defined by the maximum value of said quality of service parameter and sufficient system resources are available.

2. A method according to claim 1, wherein the method is implemented in a packet-switched data transmission system in connection with the wireless telecommunications system, such as the GPRS system.

3. A method according to claim 1, wherein the method is implemented in a circuit-switched data transmission system in connection with the wireless telecommunications system, such as the HSCSD system.

4. A method according to claim 1, wherein the method is implemented in an intelligent network-based data transmission system in connection with the wireless telecommunications system, such as the CAMEL system.

5. A method according claim 1, wherein said quality of service parameters comprise at least one of the following parameters: data rate, delay, error ratio, multislot class.

6. A method according to claim 1, further comprising defining at least one subscriber-specific maximum value of the quality of service parameter is defined on the basis of another parameter, such as the time or location of the terminal.

7. A method according to claim 1, wherein a service provider defines the maximum value of at least one subscriber-specific quality of service parameter.

8. A wireless telecommunications system, which comprises at least one terminal and a fixed network which comprises a database for storing subscriber data, the quality of service of data transmission being defined by means of quality of service parameters in the system; the system comprising means for defining a subscriber-specific maximum value for at least one quality of service parameter;

means for storing the subscriber-specific maximum value of the at least one quality of service parameter, and means for checking the subscriber-specific maximum value of said quality of service parameter such that the at least one quality of service parameter requested by the terminal is compared with the subscriber-specific maximum value of the quality of service parameter, whereby in response to a connection establishment request defined with at least one quality of service parameter made by the terminal, the system is arranged to offer connection establishment with lower values of the quality of service parameters to the terminal to be accepted if at least one of the quality of service parameters exceeds the maximum value defined for said quality of service parameter or the resources of the system, or alternatively, establish a connection if each qualify of service parameter requested by the terminal is within the limits defined by the maximum value of said quality of service parameter and sufficient system resources are available.

9. A telecommunications system according claim 8, wherein the system comprises a wireless packet-switched data transmission system, such as the GPRS system.

10. A telecommunications system according to claim 8, wherein the system comprises a wireless circuit-switched data transmission system, such as the HSCSD system.

11. A telecommunications system according to claim 8, wherein the system comprises an intelligent network-based data transmission system, such as the CAMEL system.

12. A telecommunications system according to claim 8, wherein the quality of service parameters comprise at least one of the following parameters: data rate, delay, error ratio, multislot class.

13. A telecommunications system according to claim 8, wherein the system is arranged to define at least one subscriber-specific maximum value of the quality of service parameter by means of another parameter, such as the time or location of the terminal.

14. A telecommunications system according to claim 8, wherein a service provider is arranged to define at least one subscriber-specific maximum value of the quality of service parameter.

* * * * *